(12) United States Patent
Araki et al.

(10) Patent No.: US 8,199,428 B2
(45) Date of Patent: Jun. 12, 2012

(54) CLAMP OF DISK ROTATION DRIVER

(75) Inventors: Toshimitsu Araki, Aikoh-gun (JP);
Takashi Ogino, Aikoh-gun (JP); Atsushi Shitama, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 247 days.

(21) Appl. No.: 12/596,909

(22) PCT Filed: Mar. 24, 2008

(86) PCT No.: PCT/JP2008/000697
§ 371 (c)(1),
(2), (4) Date: Dec. 22, 2009

(87) PCT Pub. No.: WO2008/139676
PCT Pub. Date: Nov. 20, 2008

(65) Prior Publication Data
US 2010/0097719 A1    Apr. 22, 2010

(30) Foreign Application Priority Data

Apr. 27, 2007 (JP) ................ 2007-119153

(51) Int. Cl.
*G11B 17/02* (2006.01)
(52) U.S. Cl. .................................. 360/99.12
(58) Field of Classification Search ............... 360/99.12, 360/98.08, 99.08, 99.09, 99.02
See application file for complete search history.

(56) References Cited

U.S. PATENT DOCUMENTS

| 5,940,244 | A | 8/1999 | Canlas et al. |
| 2002/0150027 | A1 | 10/2002 | Kato |
| 2003/0214752 | A1* | 11/2003 | Hashizume et al. ....... 360/99.12 |
| 2006/0119980 | A1* | 6/2006 | Hiramatsu et al. ........ 360/99.08 |
| 2008/0002286 | A1* | 1/2008 | Sato ............................... 360/86 |

FOREIGN PATENT DOCUMENTS

| JP | 4-090046 | 8/1992 |
| JP | 5-089629 | 4/1993 |
| JP | 5-258525 | 10/1993 |
| JP | 8-321107 | 12/1996 |
| JP | 2004-015842 | 1/2004 |
| JP | 2004-295962 | 10/2004 |

* cited by examiner

*Primary Examiner* — Allen Cao
(74) *Attorney, Agent, or Firm* — Jordan and Hamburg LLP

(57) ABSTRACT

A clamp for a disk rotation driver stably and surely supports a disk in the disk rotation driver.

The clamp 7 for a disk rotation driver 1 having a central portion and a periphery being circumferentially provided with a contact portion 13, the central portion fastened to a hub 5 to be rotated, and the contact portion 13 pressed against a recordable disk 3 attached to the hub 5 to apply a pressing force Fv to the disk 3 in a rotation axis direction and fixedly support the magnetic disk 3 on the hub 5, the clamp 7 comprising: a wall portion 25 extending from the periphery and being oriented in the rotation axis direction to form the contact portion 13 so that a frictional force μFy produced between the contact portion 13 and the magnetic disk 3 and resisting a locomotion Fx that acts on the contact portion 13 and radially outwardly biases the contact portion 13 when the contact portion 13 is in contact with the magnetic disk 3 is equal to or larger than the locomotion Fx.

3 Claims, 4 Drawing Sheets

CLAMP OF DISK ROTATION DRIVER

TECHNICAL FIELD

The present invention relates to a clamp of a disk rotation driver such as a hard disk drive used for an information processing unit such as a computer.

BACKGROUND TECHNOLOGY

There are conventional clamps for a disk rotation driver shown in FIGS. 9 and 10 and Japanese Unexamined Patent Application Publication No. 2004-295962.

FIGS. 9 and 10 are sectional views partly showing disk rotation drivers in which FIG. 9 shows a disk dive supporting a single magnetic disk 101 and FIG. 10 shows a disk rotation driver supporting two magnetic disks 101.

In each of FIGS. 9 and 10, the clamp 103 has a central portion fastened to a hub 107 with a screw 105, and a contact portion 109 formed along a periphery of the clamp 103. The contact portion 109 is in contact with a spacer 111 or the magnetic disk 101.

The clamp 103 applies a pressing force to the magnetic disk 101 in a rotation axis direction, thereby fixedly supporting the magnetic disk 101 on the hub 107.

The conventional clamp 103 however has a problem that the pressing force acting on the magnetic disk 101 is unstable.

Namely, when the clamp 103 is fixed to the hub 107 with the screw 105, the central portion of the clamp 103 shifts from a before-fastened state indicated with continuous lines in FIG. 11 to an after-fastened state indicated with dot-and-dash lines in FIG. 11. Due to the shift of the central portion of the clamp 103, the contact portion 109 of the clamp 103 is dislocated and is radially outwardly widened.

As a result, the pressing force of the clamp 103 acting on the magnetic disk 101 spreads to ineffectively press the magnetic disk 101.

Namely, the pressing force of the clamp 103 that presses the magnetic disk 101 weakens, and if an external force such as a shock is applied, the magnetic disk 101 will move to cause a data write or read error.

A frictional force that resists the force of widening the contact portion 109 is variable depending on the state of an interface between the clamp 103 and the magnetic disk 101. This makes the pressing force of the clamp 103 acting on the magnetic disk 101 unstable to deteriorate the disk supporting performance of the clamp 103.

DISCLOSURE OF INVENTION

Problems to be Solved by Invention

A problem to be solved by the invention is that a pressing force of a clamp pressing a disk weakens and is unstable.

Means to Solve the Problem

In order to surely and stably support a disk, the present invention is most characterized by a clamp for a disk rotation driver having a central portion and a periphery being circumferentially provided with a contact portion, the central portion fastened to a rotary member to be rotated, and the contact portion pressed against a recordable disk attached to the rotary member to apply a pressing force to the disk in a rotation axis direction and fixedly support the disk on the rotary member, the clamp comprising: a wall portion extending from the periphery and being oriented in the rotation axis direction to form the contact portion so that a frictional force produced between the contact portion and the disk and resisting a locomotion that acts on the contact portion and radially outwardly biases the contact portion when the contact portion is in contact with the disk is equal to or larger than the locomotion.

Effect of Invention

The present invention includes a central portion and a periphery being circumferentially provided with a contact portion, the central portion fastened to a rotary member to be rotated, and the contact portion pressed against a recordable disk attached to the rotary member to apply a pressing force to the disk in a rotation axis direction and fixedly support the disk on the rotary member, the clamp comprising: a wall portion extending from the periphery and being oriented in the rotation axis direction to form the contact portion so that a frictional force produced between the contact portion and the disk and resisting a locomotion that acts on the contact portion and radially outwardly biases the contact portion when the contact portion is in contact with the disk is equal to or larger than the locomotion. As this result, it can prevent the contact portion from radially outwardly moving.

Namely, the clamp can prevent the pressing force of the contact portion acting on the disk from dispersing, keep the high pressing force, and surely support the disk.

Since the clamp prevents the contact portion from radially outwardly shifting, no change occurs in the frictional force between the contact portion and the disk. Namely, no shift occurs between the contact portion and the disk. As a result, the clamp can stably support the disk in the disk rotation driver.

BEST MODE OF IMPLEMENTING INVENTION

The present invention realizes the object surely and stably supporting a disk by means of a wall portion that is oriented in the rotation axis direction and is provided with the contact portion.

Embodiment 1

[Disk Rotation Driver]

FIG. 1 is a sectional view partly showing a disk rotation driver employing a clamp according to the embodiment 1 of the present invention.

According to the embodiment 1 shown in FIG. 1, the disk rotation driver 1 is incorporated in a hard disk drive to turn a magnetic disk 3 that is information recordable and readable.

The disk rotation driver 1 has a hub 5 serving as a rotary member to be rotated. On the hub 5, the magnetic disk 3 is fixedly supported with a pressing force in a rotation axis direction received from a clamp 7.

The hub 5 has a circumferential projection portion 9 for supporting the disk 3. On the inner side of the projection 9, there is a joint shaft 11.

The clamp 7 is made of, for example, a plate spring and is circumferentially formed. The clamp 7 has a central portion 15 and a periphery on which a contact portion 13 is circumferentially provided. The central portion 15 is fixedly fastened to the joint shaft 11 of the hub 5 with a screw 17. The contact portion 13 of the clamp 7 is in contact with the magnetic disk 3 and applies a pressing force to the disk 3 in the rotation axis direction, to fixedly support the disk 3 on the hub 5.

[Clamp]

The clamp 7 is configured as shown in the sectional view of FIG. 2. The clamp 7 generally has a hat-like sectional shape. The central portion 15 of the clamp 7 has a diameter D1 and is depressed relative to the peripheral portion 19 of the clamp 7. The central portion 15 has a through hole 21 having a diameter D2 for passing the screw 17.

The peripheral portion 19 slightly inclines toward the central portion 15. The peripheral portion 19 has through holes 23 formed at regular intervals in a circumferential direction. The through holes 23 are for a positioning purpose and for reducing the weight of the clamp 7. The peripheral portion 19 may be flat without inclination.

Along the outer periphery of the peripheral portion 19, i.e., along the periphery of the clamp 7, there is a wall portion 25 that is oriented in the rotation axis direction and is provided with the contact portion 13. The wall portion 25 is circumferentially continuous. The wall portion 25 may be circumferentially discontinuous if a sufficient rigidity is securable for the wall portion 25.

The peripheral portion 19 is continuous to the wall portion 25 through a first circular bend 27 having a radius R1 and the wall portion 25 is continuous to a flange 29 through a second circular bend 31 having a radius R2. The contact portion 13 forms a contact circle at a portion of the second bend 31 that is in contact with the magnetic disk 3. A plane on which the contact circle exists is orthogonal to the rotation axis direction. The flange 29 is displaced toward the peripheral portion 19 from the contact portion 13 so that the contact portion 13 is configured to be in contact with the disk 3 surely. It is possible to flatten the flange 29 along the plane on which the contact circle of the contact portion 13 is present.

The diameter D3 and height H1 of the wall portion 25 are determined according to, for example, the joint shaft 11 and are designed so that the contact portion 13 applies a proper pressing force to the magnetic disk 3 when the clamp 7 is fastened and fixed to the joint shaft 11 with the screw 17. The diameter D3 of the wall portion 25 is measured at the contact circle of the contact portion 13 that is in contact with the disk 3. The height H1 of the wall portion 25 is measured in the rotation axis direction between an intersection of extensions of outer surfaces of the peripheral portion 19 and wall portion 25 and the contact circle of the contact portion 13 that is in contact with the disk 3.

The wall portion 25 is oriented in the rotation axis direction to have the contact portion 13, and is configured so that a frictional force between the contact portion 13 and the magnetic disk 3 resists a locomotion that acts on the contact portion 13 and radially outwardly biases the contact portion 13 when the contact portion 13 is in contact with the disk 3. Namely, the wall portion 25 is configured so that such a frictional force is equal to or larger than such a locomotion.

According to the present embodiment, the wall portion 25 forms an angle $\theta 1$ relative to the rotation axis direction and a frictional coefficient $\mu$ between the contact portion 13 and the magnetic disk 3 satisfies the condition of "$\mu \geq \tan \theta 1$." Additionally, the angle $\theta 1$ is 4°.

FIG. 3 is a sectional view showing a clamp for a disk rotation driver according to a modification.

In FIG. 3, the clamp 7A has a wall portion 25A that forms an angle $\theta 2 = 3.7°$ with respect to the rotation axis direction. The wall portion 25A has a height H2 that is higher than the height H1. According to tests to be explained later conducted by this applicant, the angle $\theta$ formed by the wall portions 25, 25A with respect to the rotation axis direction must satisfy the condition of "$0 \leq \theta \leq 8.5°$." The modification shown in FIG. 3 satisfies this condition.

According to studies made by this applicant, in existing general disk rotation drivers, clamps have frictional coefficients $\mu$ in the range of 0.12 to 0.15 with respect to magnetic disks.

FIG. 4 is a view explaining a method of measuring a frictional coefficient $\mu$. In FIG. 4, a clamp is placed on a magnetic disk and the magnetic disk is gradually inclined. When the clamp starts to move on the disk, an angle $\alpha$ of the disk is measured.

In FIG. 4, the following is established:

$$W \sin \alpha = \mu W \cos \alpha$$

where W is the weight of the clamp.

Then, the frictional coefficient $\mu$ is calculated as follows:

$$\mu = \tan \alpha$$

Since $\theta < \tan^{-1} \mu$, the contact portion of the clamp will not move radially outwardly if the condition of "$0 \leq \theta \leq 6.8°$ to 8.5°" is met and the clamp will efficiently support the magnetic disk.

FIG. 5 is a sectional view partly showing a clamp for a disk rotation driver according to another modification.

The clamp 7B according to this modification has a wall portion 25B that forms an angle "$0 \leq \theta 3 \leq 8.5°$" with respect to the rotation axis direction. Unlike the wall portions shown in FIGS. 2 and 3, the wall portion 25B has no linear section. Namely, the wall portion 25B has first and second bend sections 27 and 31 that are continuous to each other through an inflection point.

In FIGS. 2 and 3, the wall portions 25, 25A have a linear section, and therefore, the angle $\theta 1$, $\theta 2$ of the wall portions 25, 25A relative to the rotation axis direction are defined as an angle between the linear section and the rotation axis direction. On the other hand, the clamp 7B of FIG. 5 has no linear section, and therefore, the angle $\theta 3$ of the wall portion 25B relative to the rotation axis direction is defined as follows.

FIG. 6 is a skeleton view showing segments passing through-thickness centers of a peripheral portion 19, the first and second bends 27 and 31, and a flange 29. The first and second bends 27 and 31 have radii R1 and R2, respectively, and are directly continuous to each other through the inflection point P. The slant segment L passing through the inflection point P is a tangent of circles of the first and second bends 27 and 31.

Accordingly, the angle $\theta 3$ between the rotation axis direction and the wall portion 25B having no linear sections is defined as an angle between the segment L and the rotation axis direction.

[Clamp Operation]

FIG. 7 is a view explaining a relationship between the angle $\theta$ ($\theta 1$, $\theta 2$) and a clamping force F.

The clamp 7 is fastened and fixed to the hub 5 with the screw 17 and the contact portion 13 is pressed to the magnetic disk 3 to apply a pressing force F to the disk 3.

At this time, forces acting on the contact portion 13 are as shown in FIG. 7. The force F from the contact portion 13 is divided into component forces Fx and Fy, where Fx is a locomotion acting on the contact portion 13 and Fy is a pressing force in the rotation axis direction. $\mu$Fy is a frictional force that resists Fx.

The forces Fx and Fy are expressed as follows:

$$Fx = F \sin \theta$$

$$Fy = F \cos \theta$$

The contact portion 13 will not move in a radial outward direction if the following condition is satisfied:

$$\mu Fy \geq Fx$$

Namely, the contact portion 13 will not move in the radial outward direction and will stably and surely support the magnetic disk 3 if the following conditions are met:

$$\mu F\cos\theta \geq F\sin\theta$$

$$\mu \geq \tan\theta$$

[Experimental Result]

Comparison between the clamps of the present invention and the clamp of a conventional product of FIG. 9 has been conducted in terms of pressing force.

A pressing force is measured as shown in FIG. 8. Namely, a clamp 7 is placed on a surface plate 33 and the clamp 7 receives a deflection of 0.25 mm in an axial direction with a rod 35 of 5.1 mm in diameter. A reaction force acting on the rod 35 is measured. Measured results are as follows:

|  | Deflection | Pressing force | Plate thickness |
|---|---|---|---|
| FIG. 9 (Conventional product) | 0.25 mm | 230 N | 0.55 mm |
| FIG. 2 (Embodiment product) | 0.25 mm | 243 N | 0.38 mm |
| FIG. 3 (Embodiment product) | 0.25 mm | 156 N | 0.335 mm |

By comparison, the conventional product of FIG. 9 and the embodiment product of FIG. 2 provide nearly the same pressing force. The embodiment product of FIG. 2, however, is thinner than the conventional product of FIG. 9.

It is known that the spring constant of a plate spring increases in cubic proportion to the thickness thereof. By comparison, the embodiment products of FIGS. 2 and 3 provide the following:

$$(0.38\text{ mm}/0.335\text{ mm})^3 \times 156\text{ N} = 228\text{ N}$$

Like the case of a plate spring, the clamps 7 and 7A of FIGS. 2 and 3 increase their spring constants substantially in cubic proportion to the thicknesses thereof.

If the embodiment product of FIG. 2 has the same thickness as the conventional product of FIG. 9, the following will be obtained:

$$(0.55\text{ mm}/0.38\text{ mm})^3 \times 243\text{ N} = 866\text{ N}$$

Namely, the embodiment product of FIG. 2 can produce a pressing force Fy that is about 3.8 times as large as that provided by the conventional product.

The embodiment product of FIG. 5 provides a result similar to those of the embodiment products of FIGS. 2 and 3.

Effect of the Embodiment

According to the present embodiment of the present invention, a clamp 7 (7A) for the disk rotation driver 1 has the central portion and the periphery being circumferentially provided with the contact portion 13. The central portion is fastened to the hub 5 to be rotated, and the contact portion 13 is pressed against the recordable magnetic disk 3 attached to the hub 5 to apply the pressing force Fy to the disk 3 in the rotation axis direction and fixedly support the magnetic disk 3 on the hub 5. The clamp 7 (7A) also includes the wall portion 25 (25A) extending from the periphery and being oriented in the rotation axis direction to form the contact portion 13 so that the frictional force μFy produced between the contact portion 13 and the magnetic disk 3 and resisting the locomotion Fx that acts on the contact portion 13 and radially outwardly biases the contact portion 13 when the contact portion 13 is in contact with the magnetic disk 3 is equal to or larger than the locomotion Fx. As a result, the contact portion 13 will not move in the radial outward direction.

This configuration prevents the pressing force of the contact portion 13 on the magnetic disk 3 from dispersing, maintains the high pressing force, and surely supports the magnetic disk 3.

Since the contact portion 13 is prevented from shifting in the radial outward direction, no change occurs in the frictional force μFy and no change occurs in shifting state of the contact portion 13 with variation of the frictional force μFy. As a result, the clamp 7 (7A) can stably support the magnetic disk 3.

The wall portion 25 (25A) forms an angle θ relative to the rotation axis direction and a frictional coefficient μ between the contact portion 13 and the magnetic disk 3 satisfies the condition of "$\mu \geq \tan\theta$." This surely prevents the contact portion 13 from slipping in the radial outward direction.

The angle θ of the wall portion 25 (25A) with respect to the rotation axis direction is set to satisfy the condition of "$0 \leq \theta \leq 8.5°$." This surely prevents the contact portion 13 from moving in the radial outward direction.

DESCRIPTION OF NOTATIONS

Figure 1:
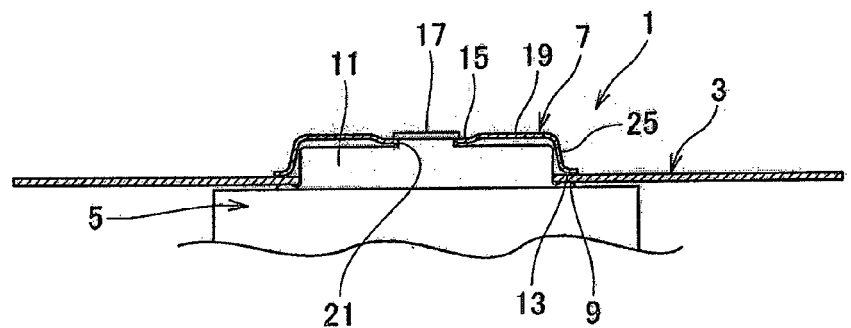
FIG. 1 It is a sectional view partly showing a disk rotation driver (Embodiment 1).
Figure 2:
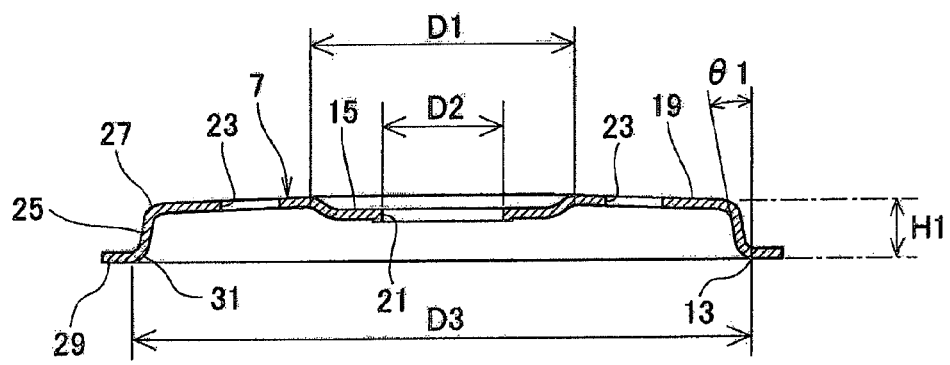
FIG. 2 It is a sectional view showing the clamp (Embodiment 1).
Figure 3:
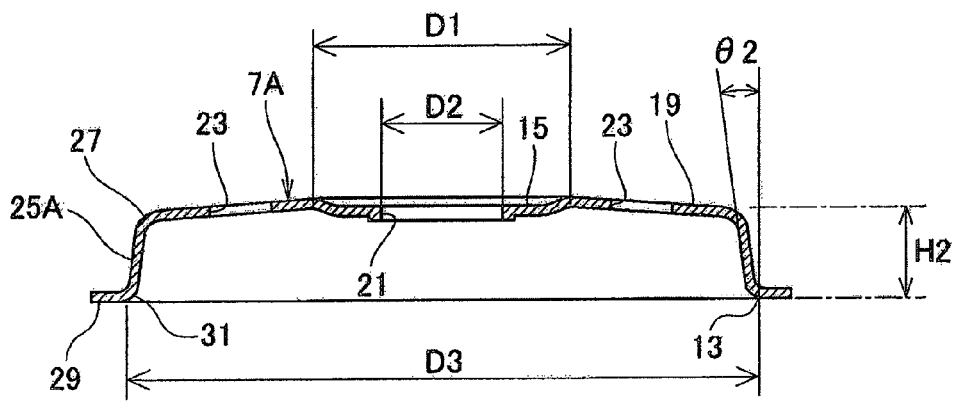
FIG. 3 It is a sectional view showing a clamp (Embodiment 1).
Figure 4:
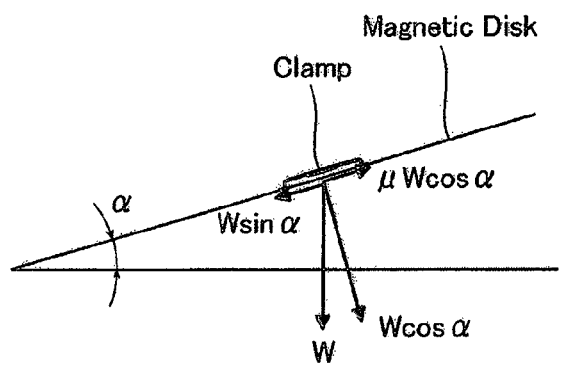
FIG. 4 It is a view explaining a method of measuring a frictional coefficient (Embodiment 1).
Figure 5:
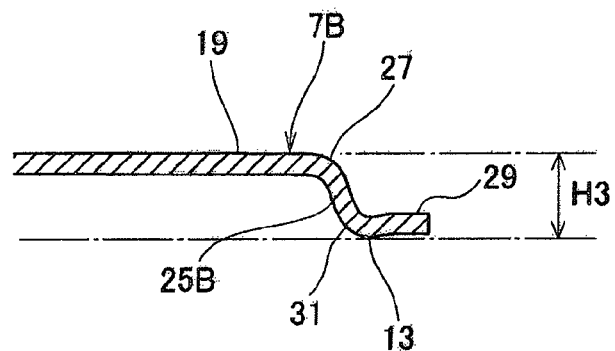
FIG. 5 It is a sectional view partly showing a clamp according to another modification (Embodiment 1).
Figure 6:
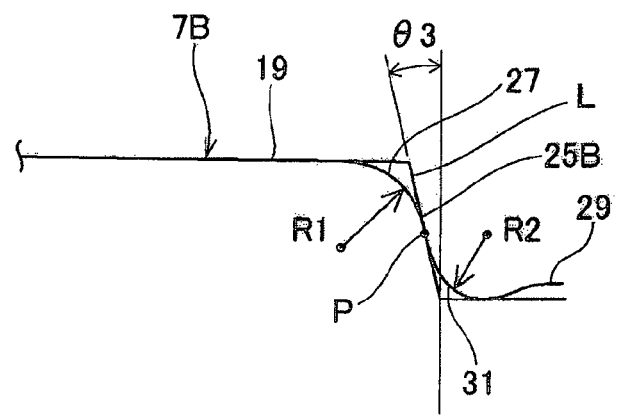
FIG. 6 It is a skeleton view showing segments passing through-thickness centers of a peripheral portion, first and second bends, and a flange (Embodiment 1).
Figure 7:
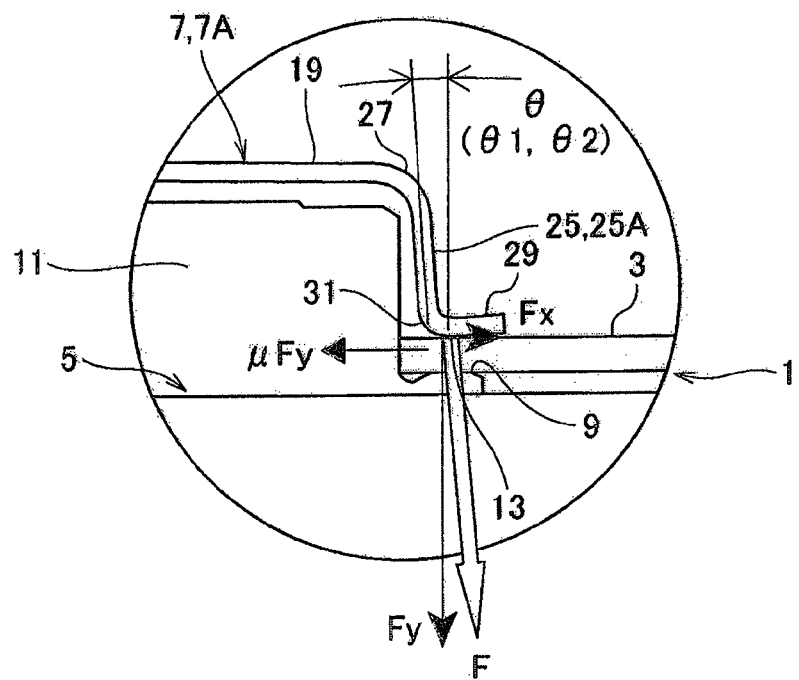
FIG. 7 It is a view explaining a relationship between an angle θ and a clamping force F.
Figure 8:
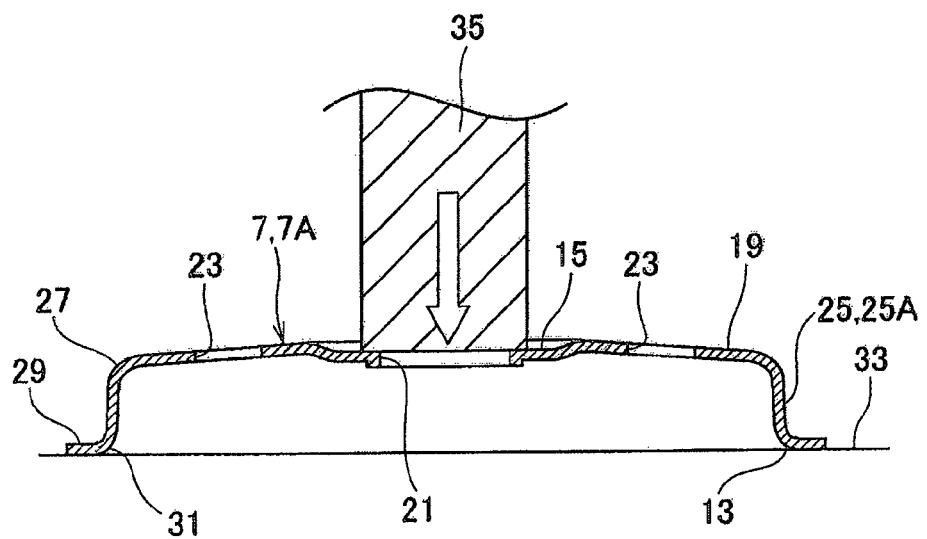
FIG. 8 It is a sectional view showing the clamp under a pressing force (Embodiment 1).
Figure 9:
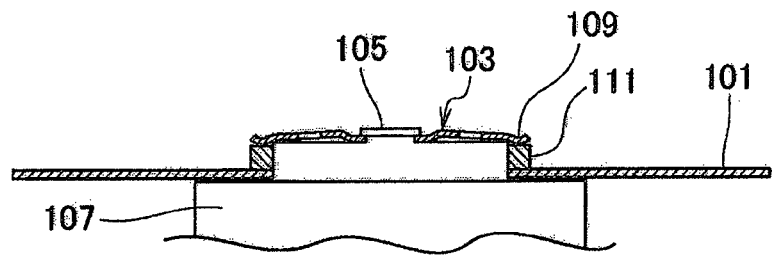
FIG. 9 It is a sectional view partly showing a disk rotation driver (Related art).
Figure 10:
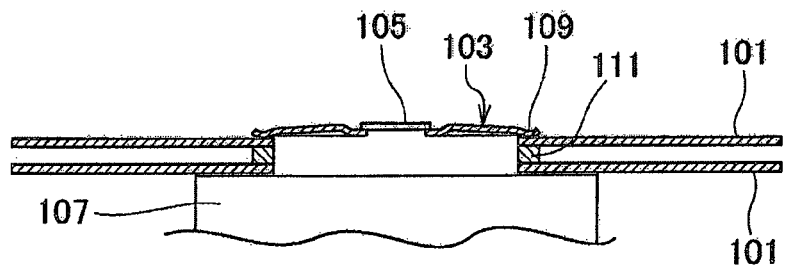
FIG. 10 It is a sectional view partly showing a disk rotation driver (Related art).
Figure 11:
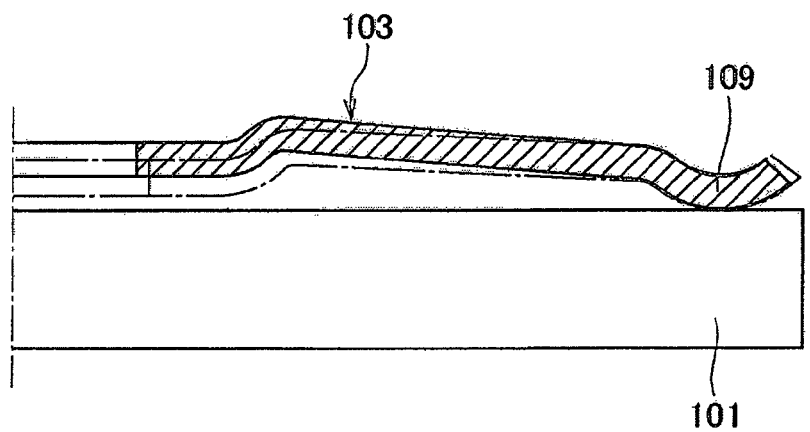
FIG. 11 It is an enlarged sectional view showing a displacement occurring in a clamp after fastening the clamp (Related art).

| | |
|---|---|
| 1 | Disk rotation driver |
| 3 | Magnetic disk |
| 5 | Hub (Rotary member) |
| 7, 7A, 7B | Clamp |
| 13 | Contact portion |
| 25, 25A, 25B | Wall portion |
| Fx | Locomotion |
| μFy | Frictional force |

The invention claimed is:

1. A clamp for a disk drive having a rotary member to be rotated and a disk attached to the rotary member, the clamp being formed as a plate spring and comprising:

a clamp body defining a central portion;

a periphery extended from the central portion and being circumferentially provided with a contact portion, the central portion being fastened to the rotary member, and the contact portion being pressed against the disk of the disk drive to apply a pressing force to the disk in a rotation axis direction and fixedly support the disk on the rotary member; and a wall portion extending from the periphery of the clamp body and being oriented in the rotation axis direction so that a frictional force is produced between the contact portion and the disk that resists a radially outward force that may radially outwardly move the contact portion when the contact portion is in contact with the disk, and is equal to or larger than the radially outward force acting on the contact portion, the wall portion being slanted relative to the rotation axis direction and radially expanding toward the contact portion so that the pressing force exerted by the contact portion includes an axial force component and a radially outward force component that is less than the axial force component.

2. The clamp of claim 1, wherein
a frictional coefficient $\mu$ between the contact portion and the disk satisfies the condition of "$\mu$ tan $\theta$" where "$\theta$" is an angle formed by the wall portion with respect to the rotation axis direction.

3. The clamp of claim 1 or 2, wherein
the angle $\theta$ formed by the wall portion with respect to the rotation axis direction satisfies the condition of "$0 \leqq \theta \leqq 8.5°$."

* * * * *